(12) United States Patent
Okuyama et al.

(10) Patent No.: US 6,215,492 B1
(45) Date of Patent: Apr. 10, 2001

(54) APPARATUS FOR SUPPORTING RETRIEVAL OF ARTICLES BY UTILIZING PROCESSED IMAGE THEREOF

(75) Inventors: Kyoko Okuyama; Kazuhiro Ohishi; Takahiro Kii, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/027,898

(22) Filed: Feb. 23, 1998

(30) Foreign Application Priority Data

Oct. 16, 1997 (JP) .................................... 9-284106

(51) Int. Cl.[7] ...................................... G06F 3/14
(52) U.S. Cl. ..................... 345/349; 345/432; 345/429; 358/462
(58) Field of Search ................... 345/349, 350, 345/432, 429; 382/176; 358/455, 452, 462

(56) References Cited

U.S. PATENT DOCUMENTS

| 5,130,819 | * | 7/1992 | Ohta ................................. 358/445 |
| 5,148,196 | * | 9/1992 | Spector ............................... 355/20 |
| 5,388,197 | * | 2/1995 | Rayner ............................. 395/328 |
| 5,404,316 | * | 4/1995 | Klingler et al. ................... 345/328 |
| 5,544,305 | * | 8/1996 | Ohmaye et al. ................... 395/326 |
| 5,682,326 | * | 10/1997 | Klingler et al. . |
| 5,684,715 | * | 11/1997 | Palmer ............................. 348/473 |
| 5,701,510 | * | 12/1997 | Johnson et al. ..................... 1/1 |
| 5,760,767 | * | 6/1998 | Shore et al. ...................... 345/328 |
| 5,991,449 | * | 11/1999 | Kimura et al. .................... 382/238 |

OTHER PUBLICATIONS

Nicolaisen, Nancy "Image browsing and viewing simplified.", Windows sources, p. 198 May, 1993.*

* cited by examiner

Primary Examiner—Raymond J. Bayerl
Assistant Examiner—Thomas T. Nguyen
(74) Attorney, Agent, or Firm—Staas & Halsey LLP

(57) ABSTRACT

An article retrieval support apparatus which is capable of limiting the number of identification data of articles among which retrieval is to be executed through displaying images of the identification data of the articles at varied transparency rates or miniaturizing rates corresponding to the novelty of the article or attribute data of the article such as repute of the article.

12 Claims, 23 Drawing Sheets

FIG. 2

| | DISPLAY POSITION | DISPLAY TYPE | ORIGINAL IMAGE SIZE (VERTICAL × HORIZONTAL) PIXELS | NUMBER OF COLORS IN ORIGINAL IMAGE | ORIGINAL IMAGE STORED ADDRESS | FILE NAME |
|---|---|---|---|---|---|---|
| 1 | 100,50 | MINIATURE IMAGE | 680×480 | FULL COLOR | 0x0A12678 | aaaa.bmp |
| 2 | 70,80 | ICON | — | 2 | — | bbbb.txt |
| 3 | .. | | | | | |

FIG. 5

| ELAPSED TIME | TRANSPARENCY RATE TO BACKGROUND |
|---|---|
| 0- 7 DAYS | 0% (WITHOUT TRANSPARENCY) |
| 8-14 DAYS | 50% |
| 15-30 DAYS | 70% |
| OVER 30 DAYS | 100% |

FIG. 8

| ELAPSED TIME | MINIATURIZING RATE TO ELAPSED-TIME |
|---|---|
| 0- 7 DAYS | 100% |
| 8-14 DAYS | 70% |
| 15-21 DAYS | 50% |
| 22-30 DAYS | 30% |
| OVER 30 DAYS | 0% |

FIG. 12

| | ATTRIBUTION STORED ADDRESS | MINIATURE IMAGE SIZE | MINIATURE IMAGE STORED ADDRESS | DISPLAY POSITION | WRITER OF THE ARTICLE | POSTING DATE |
|---|---|---|---|---|---|---|
| 1 | 0xaaff00 | VERTICAL 48pixels HORIZONTAL 54pixels | 0xbb123456 | 90,60 | XXXX | 1997.10.10 |
| 2 | 0xcc1100 | — | — | 50,90 | YYYY | 1997.10.11 |

FIG. 15

| | DISPLAY POSITION | PASTED DATE (TIME) | DISPLAY TYPE | ORIGINAL IMAGE SIZE (PIXEL) | NUMBER OF COLORS IN ORIGINAL IMAGE | ORIGINAL IMAGE STORED ADDRESS |
|---|---|---|---|---|---|---|
| 1 | 100, 50 | 1997/5/30 13:05:40 | MINIATURE IMAGE | VERTICAL 680 HORIZONTAL 480 | FULL COLOR | 0x0A12678 |
| 2 | 70, 80 | 1997/5/31 08:20:34 | ICON | — | 2 | — |
| 3 | | | | | | |

FIG. 17

| | DISPLAY POSITION | PASTED DATE (TIME) | DISPLAY TYPE | ALREADY-READ FLAG | ORIGINAL IMAGE SIZE (PIXEL) | ORIGINAL IMAGE STORED ADDRESS |
|---|---|---|---|---|---|---|
| 1 | 100, 50 | 1997/5/30 13:05:40 | MINIATURE IMAGE | 1 (ALREADY READ) | VERTICAL 680 HORIZONTAL 480 | 0x0A12678 |
| 2 | 70, 80 | 1997/5/31 08:20:34 | ICON | 0 (UNREAD) | — | — |
| 3 | | | | | | |

FIG. 19

| | DISPLAY POSITION | PASTED DATE (TIME) | DISPLAY TYPE | WRITER ID | ORIGINAL IMAGE SIZE (PIXEL) | ORIGINAL IMAGE STORED ADDRESS |
|---|---|---|---|---|---|---|
| 1 | 100, 50 | 1997/5/30 13:05:40 | MINIATURE IMAGE | AAA Co. Ms. OOO | VERTICAL 680 HORIZONTAL 480 | 0x0A12678 |
| 2 | 70, 80 | 1997/5/31 08:20:34 | ICON | △△ Univ. ○○ Taro | | ― |
| 3 | | | | | | |

FIG. 21

| | ARTICLE ID | POSTING DATE (TIME) | WRITER ID | FOLLOW-UP ID | TITLE | DISPLAY POSITION | ORIGINAL IMAGE SIZE (PIXEL) |
|---|---|---|---|---|---|---|---|
| 1 | ID○○ | 1997/5/30 13:05:40 | XX@aabbc | WITHOUT | "Hello" | 100,50 | VERTICAL 680 HORIZONTAL 480 |
| 2 | ID△△ | 1997/5/31 08:20:34 | YY@bbccd | ORIGINAL ARTICLE ID | "ON DOG" | 70,80 | — |
| 3 | | | | | | | |

APPARATUS FOR SUPPORTING RETRIEVAL OF ARTICLES BY UTILIZING PROCESSED IMAGE THEREOF

BACKGROUND OF THE INVENTION

The present invention relates to an article retrieval support apparatus such as a personal computer for supporting retrieval of articles when making reference to articles which have been posted to a network such as the Internet, and the present invention also relates to a recording medium which can be read by the article retrieval support apparatus.

Communication systems have become popular to exchange opinions with numerous people in which they make reference to or post an article from a personal computer which is connected to a network such as the Internet or personal computer network. When the number of associated people and thus the number of articles increase in such a communication system, it becomes difficult to retrieve an article which the user would like to make reference to.

With this point in mind, it has been proposed for an apparatus which comprises a function of supporting retrieval of articles by displaying on the screen a list of identification data of articles which may be miniature image of contents of an article or of images attached to an article.

However, although the conventional apparatus comprising such a function as to display the list of identification data provides the user a retrieval supporting function to make him or her intuitively understand the content of the article by the identification data which may be a figure or a miniature image, the number of articles that the user is able to retrieve through confirming each of the figures or miniature images with his or her own eyes is limited. Therefore, the retrieval supporting function does not work effectively when the number of articles is enormous.

Further, when generating miniature images as identification data of articles, there are different methods for obtaining clear miniature images, depending on whether the original image is a binary image such as a text, or a color image such as a bit map, and in case of a color image, it depends on whether a large number of colors are used or only a small number (e.g. an image written with a pencil). However, since the miniaturizing method of an image is selected by the user in such a conventional apparatus, it presents a drawback in that beginners or children having no knowledge of image processing may not be able to select a most suitable miniaturizing method.

BRIEF SUMMARY OF THE INVENTION

The present invention has been made in view of these drawbacks, and it is an object of the present invention to provide an article retrieval support apparatus such as a personal computer which is capable of limiting the number of identification data of articles among which retrieval is to be executed through displaying images of the identification data of the articles at varied transparency rates or miniaturizing rates corresponding to the novelty of the article or attribute data of the article such as repute of the article, and it is also an object of the present invention to provide a recording medium which can be read by the article retrieval supporting apparatus.

It is further an object of the present invention to provide an article retrieval support apparatus such as a personal computer which can be easily used also by beginners or children having no knowledge of image processing wherein a most suitable miniaturizing method is automatically selected according to the original image when generating a miniature image of identification data of the article, and it is also an object of the present invention to provide a recording medium which can be read by the article retrieval supporting apparatus.

According to the present invention, it is automatically determined how a miniature image is to be generated, depending on the type of an image of an article (e.g. text, bitmap, number of colors, etc.), by either of the following methods. In the first method, an average value of pixel values of each divided image portion of an image of an article, divided according to a miniaturizing rate, is calculated in accordance with reducing rates, and a miniature image which is composed of a gathering of these averaged pixels is generated. An edge of the obtained miniature image is then detected where a gray level greatly changes, and by emphasizing and sharpening the edge, a miniature image is generated. For generating a miniature image according to the second method, it is performed, in addition to the above steps, a step of transforming a gray level of each pixel of the miniature image into a gray level by which the contrast of the miniature image is emphasized. A miniature image is generated in the third method by performing OR operation of pixel values of neighboring pixels of an image showing the content of an article.

Therefore, the apparatus according to the present invention can be easily used also by beginners or children having no knowledge of image processing.

Further, according to the present invention, a transparency rate of an image of identification data of an article is varied relative to a background thereof proportional to the length of an elapsed time from the time at which the article is posted, so that, for instance, an image of identification data of an article is displayed at a higher transparency rate for which the elapsed time from the time of the posting is longer.

Further, according to the present invention, the miniaturizing rate of an image of identification data of an article is varied proportional to the length of an elapsed time from the time at which the article is posted, so that, for instance, an image of identification data of an article is displayed smaller for which the elapsed time from the time of the posting is longer.

Further, according to the present invention, repute data indicating a height of a repute of an article is obtained from an article server, and though no images of identification data of articles are displayed for which a specified time has elapsed since they are posted, an image of identification data of an article with high repute is made to be displayed for a longer time than images of identification data of other articles by shortening the elapsed time of the articles of the high repute.

Further, according to the present invention, repute data, which may be the number of readers or the number of votes, indicating a height of a repute of the article is obtained from an article server, and identification data of articles of high repute (i.e., which the number of readers or votes exceed a specified number) are displayed in different display styles from the style of identification data of other articles by, for instance, changing the color, magnifying the image or applying a repute mark thereto.

Further, according to the present invention, when a specified figure such as a cursor figure which moves over a screen has passed over an image of identification data, an image of addition data indicating an attribution of the article (e.g. writer of the article, date of posting, etc.) is displayed in the proximity of the image of the identification data.

Further, according to the present invention, there are only displayed images representing identification data of articles which agree a display condition such as the displayable number on the screen or a term for display.

Consequently, the number of identification data of articles among which retrieval is to be executed may be limited.

The above and further objects and features of the invention will more fully be apparent from the following detailed description with accompanying drawings.

BRIEF DESCRIPTION OF THE SEVERAL VIEWS OF THE DRAWING

FIG. 2 is a conceptual diagram of a table according to embodiment 1;

FIG. 5 is a conceptual diagram of a table according to embodiment 2;

FIG. 8 is a conceptual diagram of a table according to embodiment 3;

FIG. 12 is a conceptual diagram of a table according to embodiment 5;

FIG. 15 is a conceptual diagram of a table according to embodiment 6;

FIG. 17 is a conceptual diagram of a table according to embodiment 7;

FIG. 19 is a conceptual diagram of a table according to embodiment 8;

FIG. 21 is a conceptual diagram of a table according to embodiment 9;

DETAILED DESCRIPTION OF THE INVENTION

[Embodiment 1]

Figure 1:
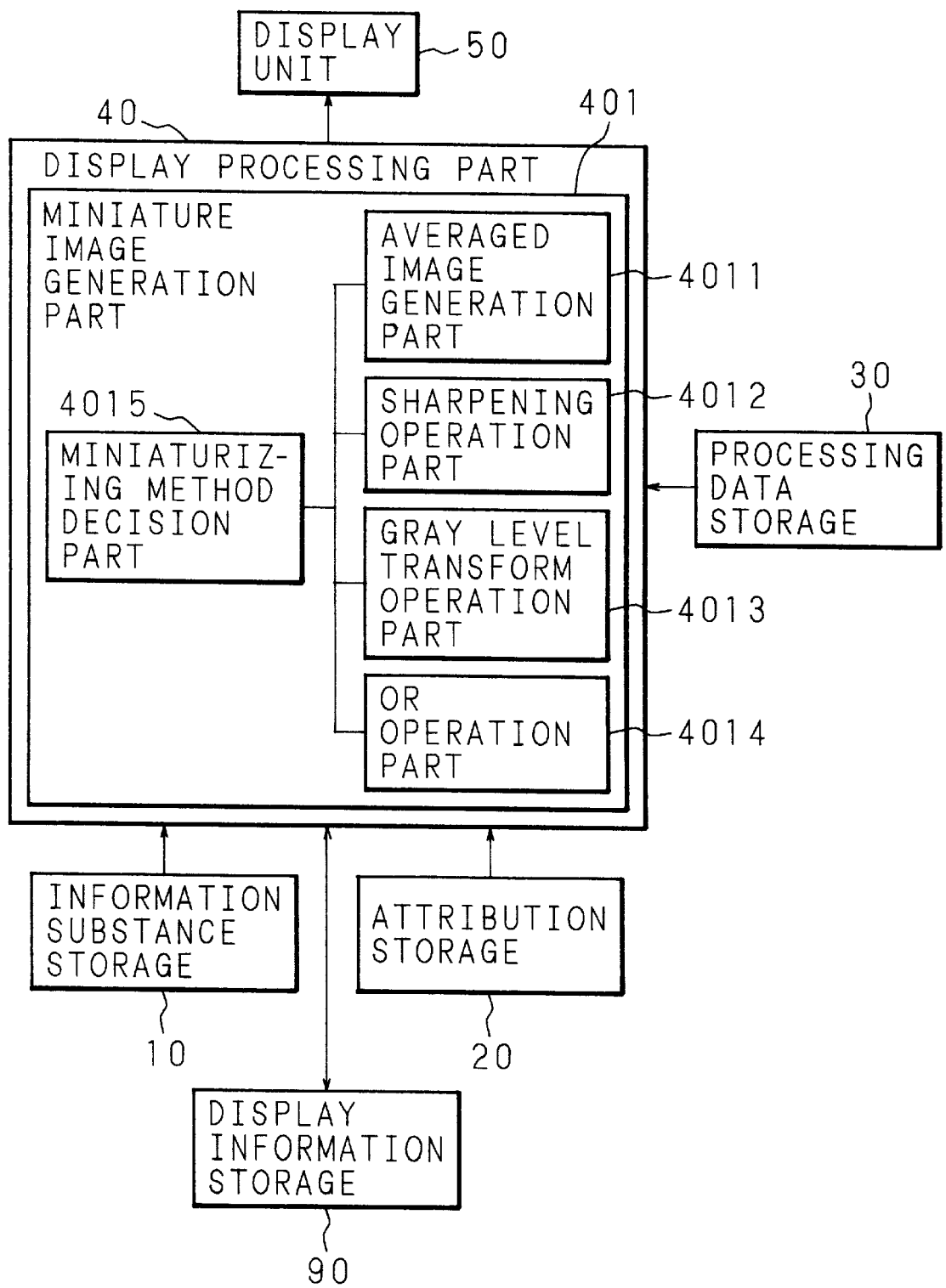
FIG. 1 is a block diagram of embodiment 1 of the present invention.

FIG. 1 is a block diagram showing embodiment 1 of a personal computer which is employed as the article retrieval support apparatus according to the present invention.

An information substance storage 10 stores the substance of articles. An attribution storage 20 stores in an attribution table thereof attribution data of the substance of the article substances which are at least (1) a display position (coordinate data) which was designated by the user by a position designating means such as a mouse in order to paste a miniature image or icon which is identification data of an article; (2) a display form of identification data (a miniature image or fixed bitmap data such as icon); (3) size of the original image for generating a miniature image (height× width); (4) the number of colors used in the original image; (5) the storage address of the original image; (6) a file name which is an identifier of an article and included in a header thereof (aaa.bmp, bbb.txt); or (7) the storage address of the article substance.

FIG. 2 is a conceptual diagram of such an attribution table.

A processing data storage 30 stores data for processing an image substance to generate a miniature image. In this embodiment, a miniaturizing rate for obtaining a miniature image from the original image or size of a miniature image (the number of pixels in height×width) is stored. It should be noted that the miniaturizing rate or size is set by the user.

A display processing part 40 generates a miniature image from an original image in a miniature image generation part 401 in case the display form of the identification data of the article substance is "miniature image".

The miniature image generation part 401 comprises, as generating means of a miniature image, an averaged image generation part 4011 for setting an averaged value of pixel values of object pixels of the original image (for instance, if reduced to half in length, four neighboring pixels) as a pixel value for one pixel; a sharpening operation part 4012 for detecting an edge of the image and emphasizing (sharpening) the edge; a gray level transform operation part 4013 for transforming a gray level of each pixel of the image into a gray level at which the contrast is emphasized; and an OR operation part 4014 for performing an OR operation of object pixels of the original image according to the miniaturizing rate and leaving black pixels.

A miniaturizing method decision part 4015 makes a most suitable generation means operate among the above-described generation means for generating a miniature image which sufficiently represents characteristics of the original image and which is also clear on referring to the attribution table of the attribution storage 20 and generates a miniature image based on data such as whether the original image is a text or a bitmap (which may be determined from the file name) or whether the number of colors is large or small in case the image is a bitmap.

A display unit 50 displays the miniature image which has been generated in the display processing part 40 on a portion of a display depending on the coordinate data in the attribution table.

It will be next explained for a method of selecting a miniaturizing method according to the attribution of the original image.

There are known several methods for generating miniature images such as (1) thinning out, (2) averaging (by the area), or (3) performing an OR operation (in case of a binary image). However, the effective method is limited depending on the characteristics of the image. For instance, while "thinning out" is effective for natural color images such as landscapes, it is not suitable for images of few colors or images of characters written with a pencil, since data will vanish.

Further, while an "averaging" method may be employed for a variety of images, images will oftentimes fade. "Performing an OR operation" can only be applied to binary images.

Therefore, according to characteristics of the original image which may be number of colors (actually used ) in the image monochrome or colored, either "averaging+sharpening" is selected when the image is a color image and the number of colors is quite large; "averaging+sharpening+gray level transformation" when it is a color image but containing only a small number of colors such as an image of a pencil drawing in order to make a color difference for clarification, since "averaging+sharpening" is not sufficient to eliminate a dim impression, and "OR operation" is performed in case the image is a text image or a binary image.

Figure 3:
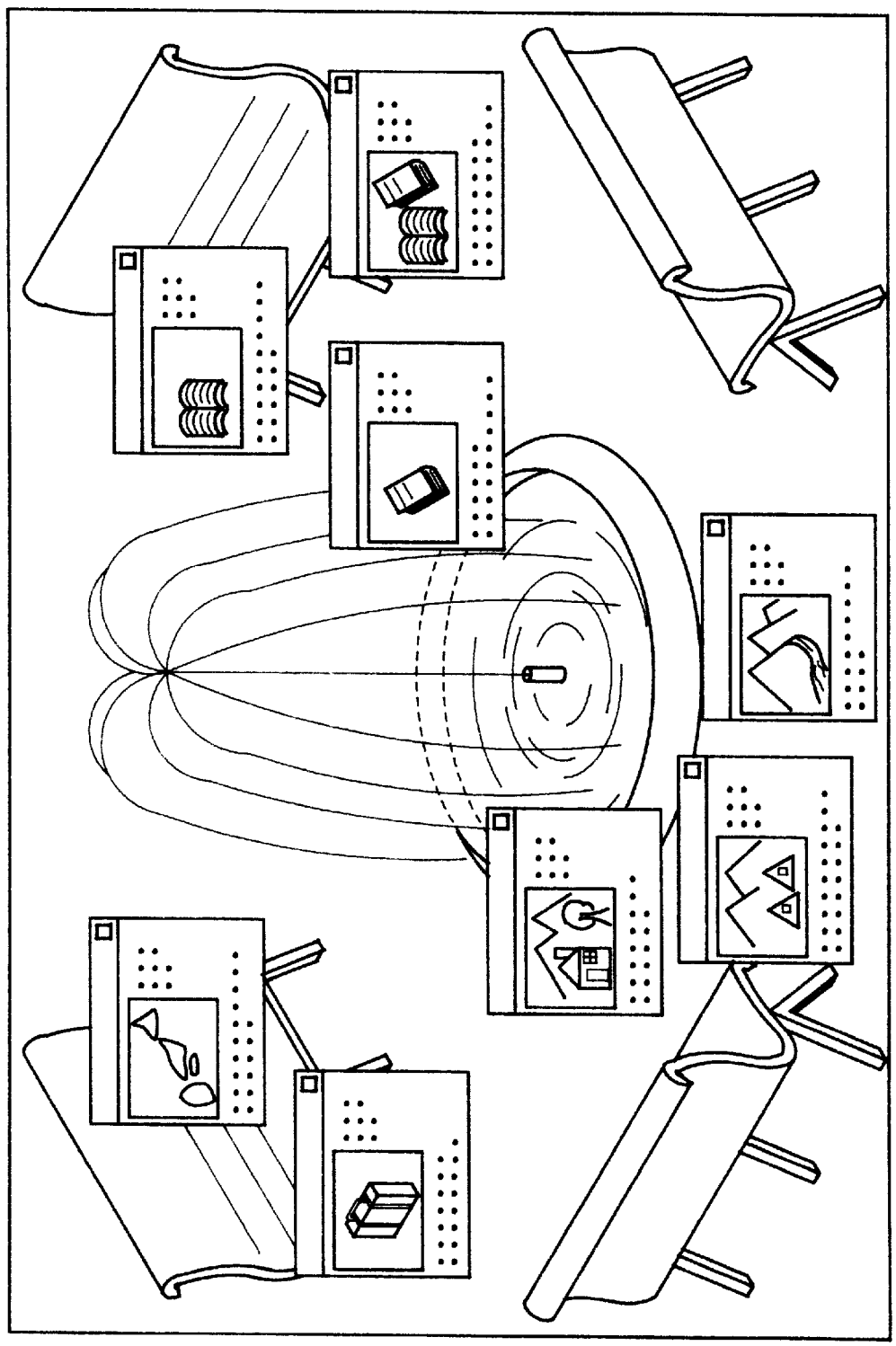
FIG. 3 is a diagram showing an example of a screen display according to embodiment 1.

FIG. 3 is a diagram showing an example of a screen display of a miniature image.

The miniature image as processed and generated as explained above is stored in a memory (not shown) of the miniature image generation part 401 and the storage address thereof is entered in the table of a display information storage 90 of FIG. 1.

It should be noted that while this embodiment has been explained by referring to a case in which the miniature image is of a rectangular shape, the shape of the miniature image is not limited to such a rectangular shape.

[Embodiment 2]

Figure 4:
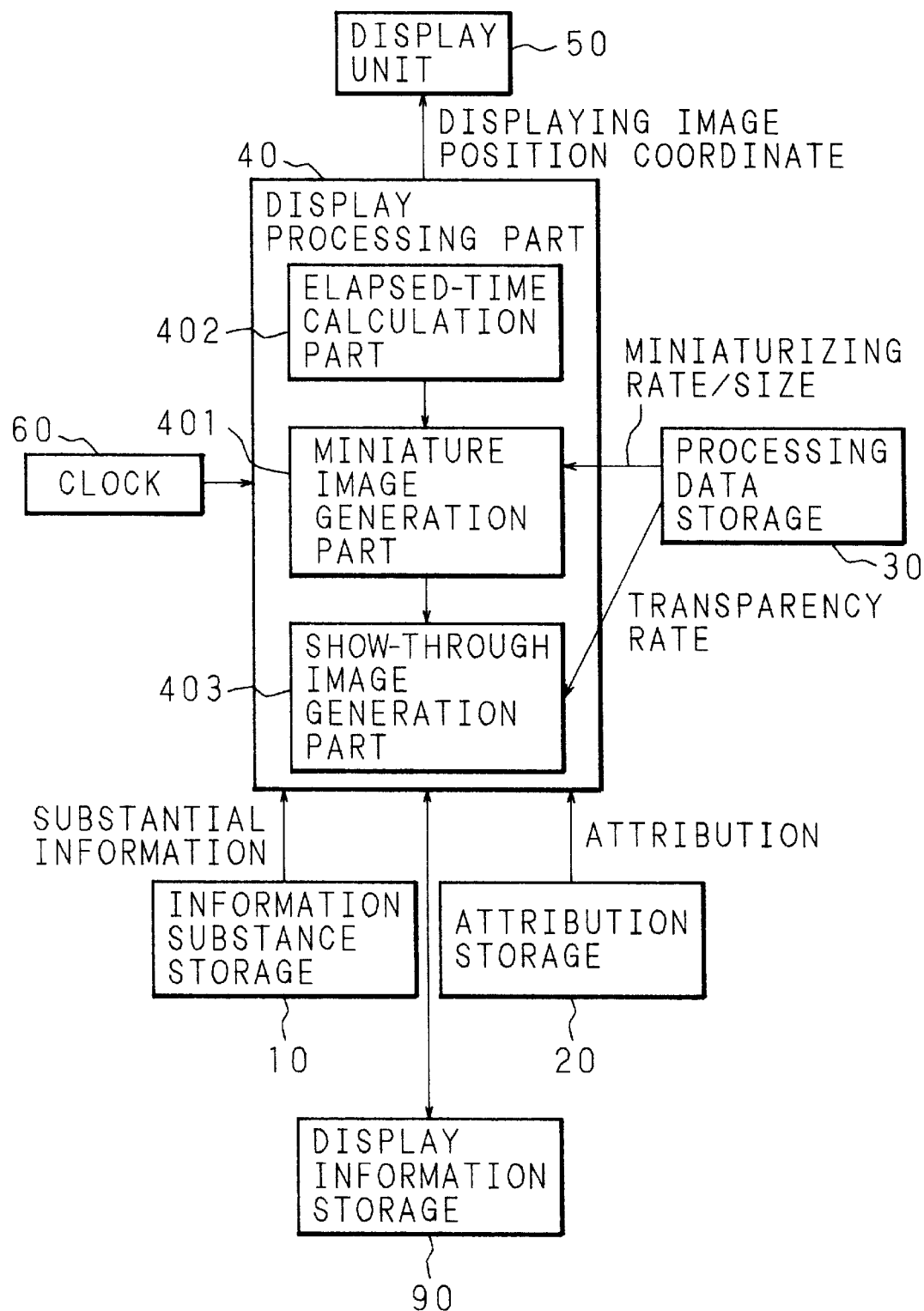
FIG. 4 is a block diagram of embodiment 2 of the present invention.

FIG. 4 is a block diagram showing embodiment 2 of a personal computer which is employed as the article retrieval support apparatus according to the present invention. It should be noted that portions which are identical with or equivalent to those of embodiment 1 are marked with the same reference numerals and explanations thereof will be partially deleted.

In this embodiment, when displaying identification data of articles as in FIG. 3 (which are miniature images in FIG. 3), identification data of older articles are displayed to be more transparent than those of newer ones.

For this purpose, the present embodiment is arranged to comprise a clock 60 for providing the display processing part 40 with the present time, wherein a processing data storage 30 stores miniaturizing rates or sizes which are supplied to a miniature image generation part 401 together with transparency rates which correspond to elapsed times that are stored in a table thereof (see FIG. 5), and a display information storage 90 stores in an attribution table thereof dates on which articles were posted.

Further, the display processing part 40 comprises an elapsed-time calculation part 402 for calculating the elapsed time from the time obtained from the attribution table at which the article was posted up to the present time given by the clock 60, and a show-through image generation part 403 for generating a miniature image of a transparency rate corresponding to the elapsed time obtained from the table of the processing data storage 30 from the miniature image generated by the miniature image generation part 401.

It should be noted that the miniature image generation part 401 stores the generated miniature image in a memory (not shown) and the storage address thereof is entered in the table of the display information storage 90.

The show-through image generation part 403 generates a show-through image by performing the following calculation for all of the pixels of the miniature images generated by the miniature image generation part 401.

$$TP(x, y)=P(x, y)\times(1-TRNSP)+BP(x', y')\times TRNSP$$

TRNSP: transparency rate

P(x, y): pixel value at position (x, y) of miniature image

BP(x, y): pixel value at coordinate (x, y) of background image (coordinate corresponding to position (x, y))

TP(x, y): generated transparent pixel value at position (x, y)

It should be noted that the transparency rate is 0 or more and 1 or less.

The display processing part 40 outputs the thus generated show-through image to the display unit 50 together with the coordinate data of the display position. However, in case the transparency rate is 1, no miniature image is displayed so that no data is output to the display unit 50.

Figure 6:
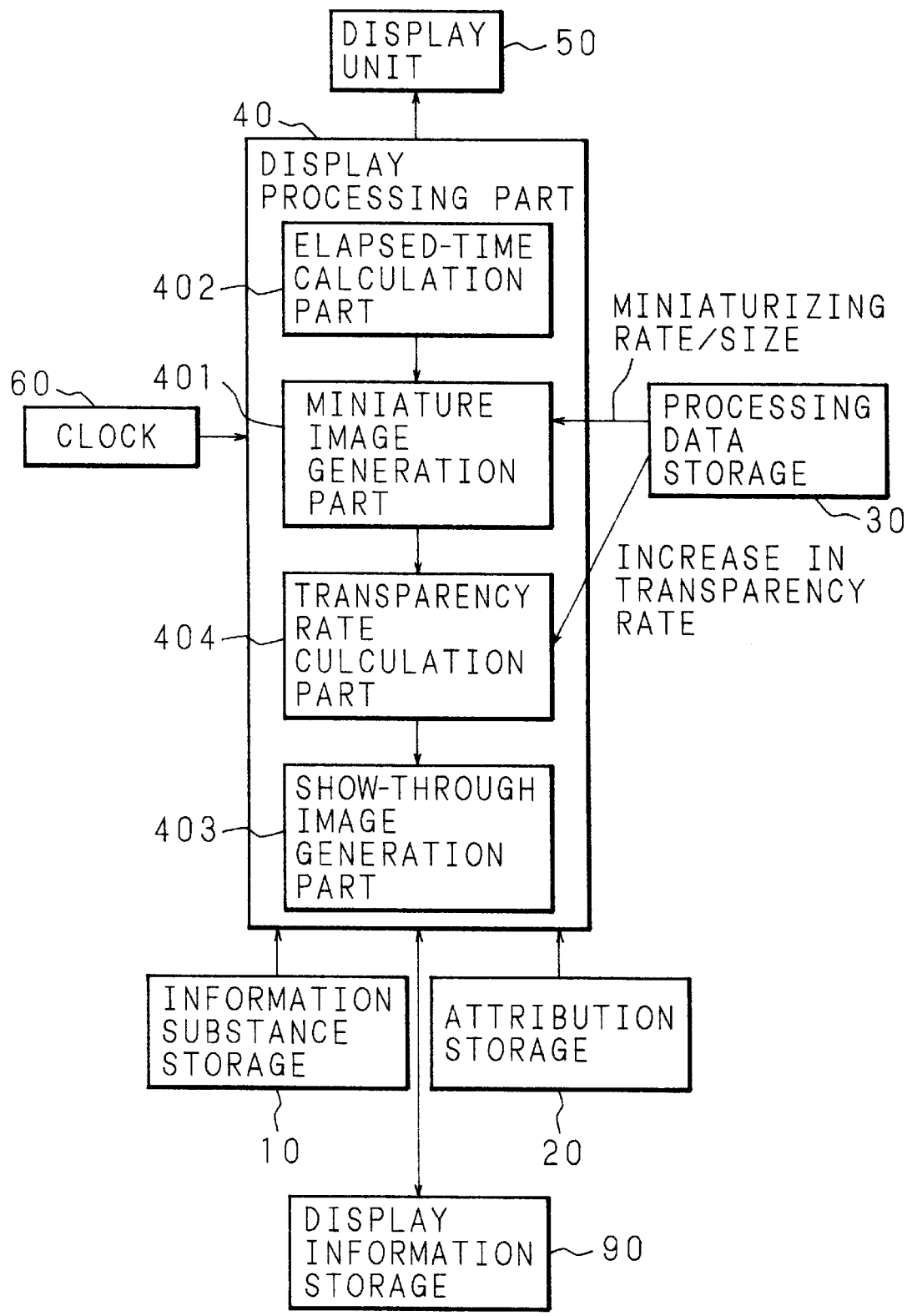
FIG. 6 is a block diagram of a modified example of embodiment 2 of the present invention.

FIG. 6 is a block diagram showing a modified example of embodiment 2. It should be noted that portions identical with or equivalent to those of embodiment 2 are marked with the same reference numerals and explanations thereof will be deleted.

In this modified example, there is no table provided for transparency rates in a processing data storage 30, and instead, the storage stores increases in transparency rates for each elapsed time such as "increasing the transparency rate by Y % for each additional time X".

In a display processing unit 40, a transparency rate calculation part 404 provides a show-through image generation part 403 with a transparency rate corresponding to an elapsed time calculated by an elapsed-time calculation part 402 based on the increase of transparency rate given by the processing data storage 30. The show-through image generation part 403 performs the above-described calculation and generates a show-through image of a transparency rate corresponding to the elapsed time then outputs the image to a display unit 50 together with the coordinate data of the display position thereof. However, in case the transparency rate is 1, no miniature image is displayed so that no date is output to the display unit 50.

[Embodiment 3]

Figure 7:
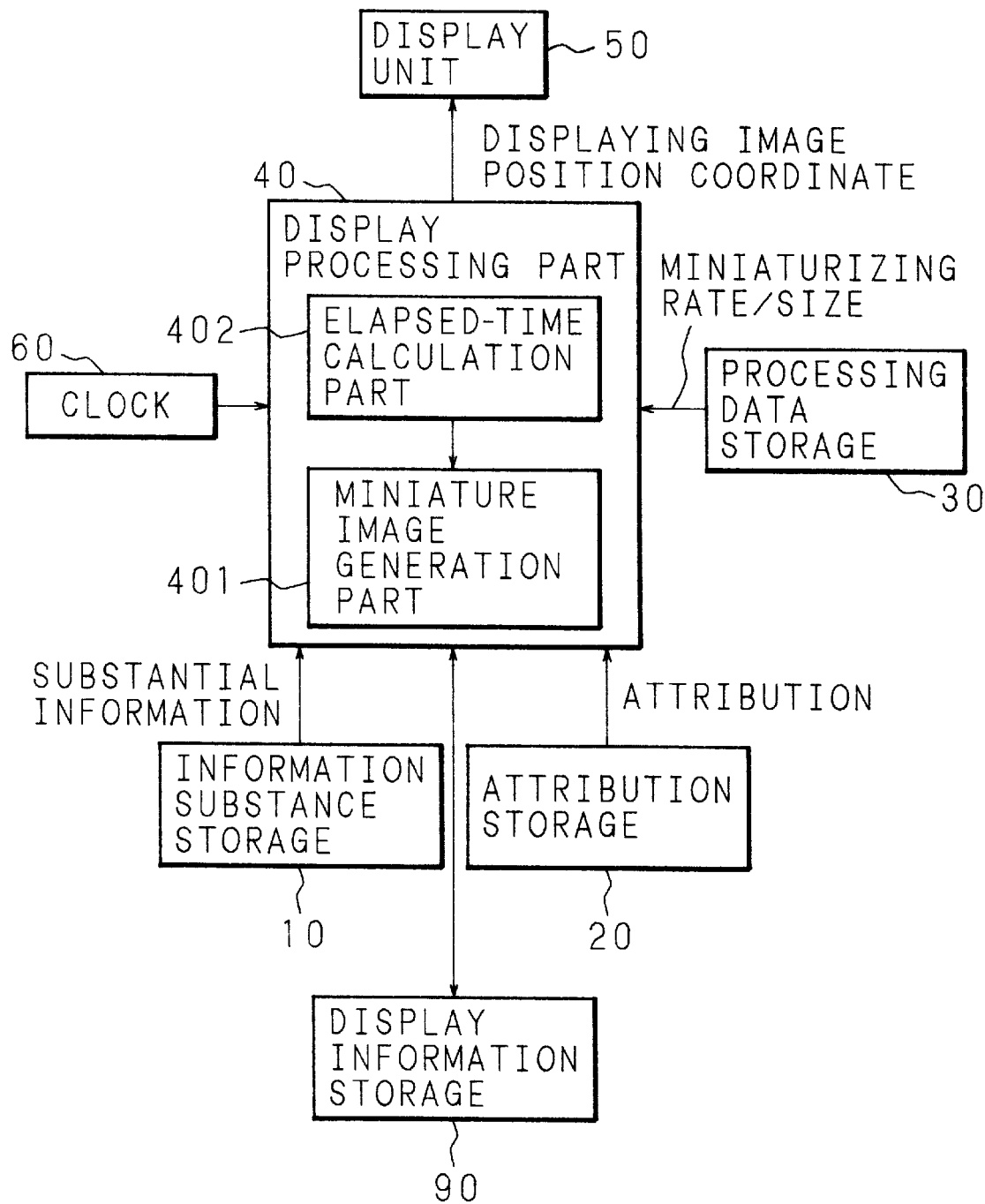
FIG. 7 is a block diagram of embodiment 3 of the present invention.

FIG. 7 is a block diagram showing embodiment 3 of a personal computer which is employed as the article retrieval support apparatus according to the present invention. It should be noted that portions which are identical with or equivalent to those of embodiment 1 are marked with the same reference numerals and explanations thereof will be partially deleted.

In this embodiment, when displaying identification data of articles as in FIG. 3 (which are miniature images in FIG. 3), identification data of older articles are displayed to be smaller than those of newer ones.

For this purpose, the present embodiment is arranged to comprise a clock 60 for providing a display processing part 40 with the present time, wherein a processing data storage 30 stores miniaturizing rates or sizes which are supplied to a miniature image generation part 401 together with miniaturizing rates which correspond to elapsed times that are stored in a table thereof (see FIG. 8), and a display information storage 90 stores in an attribution table thereof dates on which articles were posted.

Further, the display processing part 40 comprises an elapsed-time calculation part 402 for calculating the elapsed time from the time obtained from the attribution table at which the article was posted up to the present time given by the clock 60 and a miniature image generation part 401 for generating a miniature image miniaturized at a rate calculated by multiplying the miniaturizing rate of the original image obtained from the table of the processing data storage 30 by the miniaturizing rate corresponding to the elapsed time. The miniature image generation part 401 outputs the generated miniature image to a display unit 50 together with the coordinate data of the display position thereof. However, in case the miniaturizing rate is 0%, no miniature image is displayed so that no date is output to the display unit 50.

The miniature image generation part 401 stores the above-mentioned miniature image in a memory (not shown) and a storage address thereof is registered in the table of the display information storage 90.

[Embodiment 4]

Figure 9:
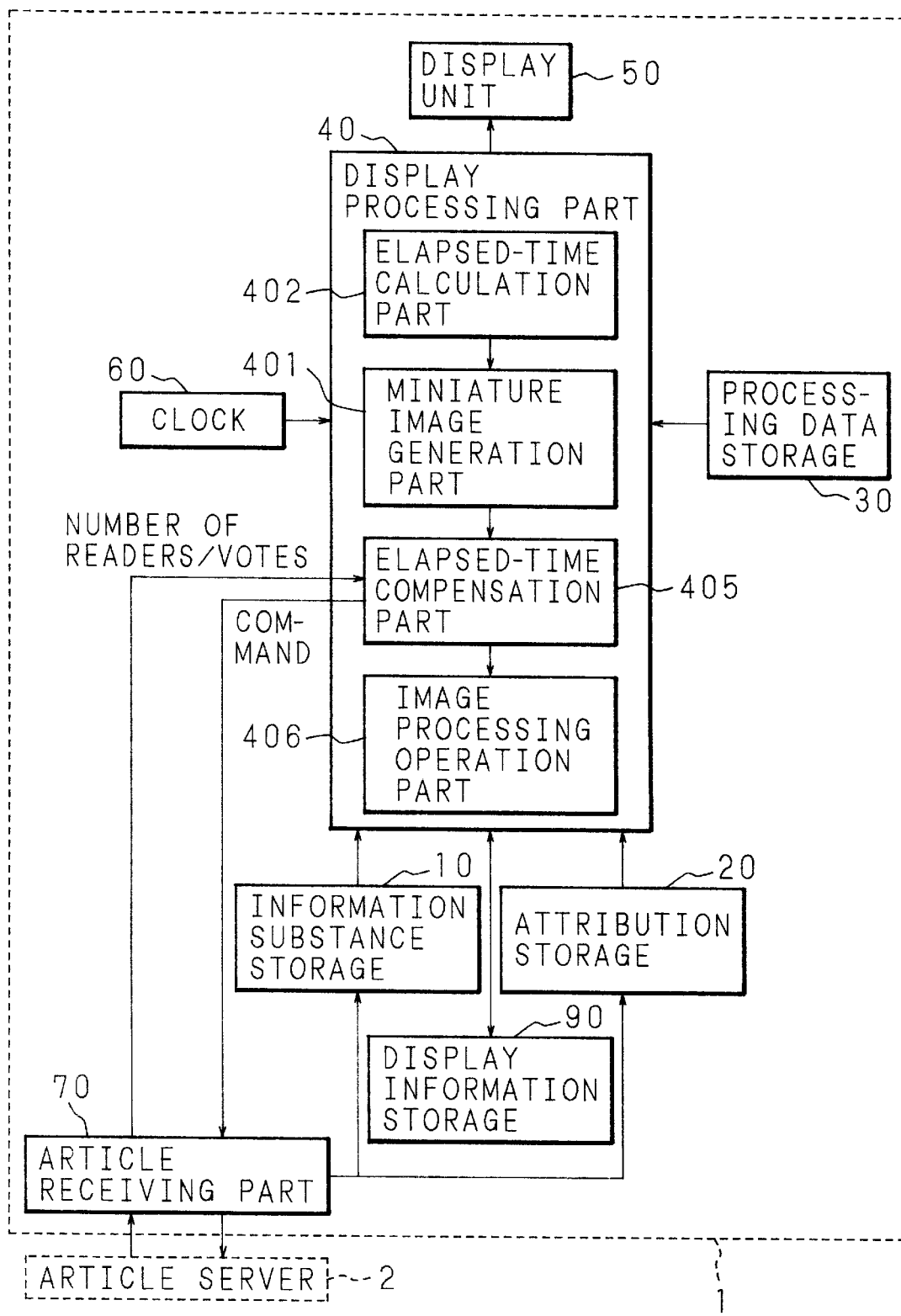
FIG. 9 is a block diagram of embodiment 4 of the present invention.

FIG. 9 is a block diagram showing embodiment 4 of a personal computer which is employed as the article retrieval support apparatus according to the present invention. It should be noted that portions that are identical with or equivalent to those of embodiment 1 are marked with the same reference numerals and explanations thereof will be partially deleted.

An article server 2 transfers articles posted from plural personal computers which are clients to personal computers which have accessed thereto, while obtaining and storing repute data such as the number of readers or votes in favor, and provides the repute data to personal computers requiring such repute data of the articles. In this embodiment, a personal computer 1 is connected as a client to the article server 2.

Further, the personal computer 1 according to this embodiment has a function to limits the number of objects to be retrieved by eliminating identification data of articles for which a specified time has been elapsed since the time of posting by, for instance, deleting the eliminated identification date from a memory of a miniature image generation part 401.The personal computer 1 also has a function to seemingly shorten the elapsed time for an article of high repute in order to display the identification data thereof as long as possible.

The miniature image generation part 401 stores the generated miniature image in a memory (not shown), and a storage address thereof is entered in a table of a display information storage 90.

For this purpose, the present embodiment is arranged to comprise a clock 60 for providing a display processing part 40 with the present time, and an attribution storage 20 stores the date of posting of the article in an attribution table. An article receiving part 70 stores the information substance received from the article server 2 in an information substance storage 10 and attribution data in the attribution storage 20. The article receiving part 70 receives repute data such as the number of readers or votes upon transmitting a command requesting for repute data which is output from an elapsed-time compensation part 405 to the article server 2, and transfers the repute data to an elapsed-time compensation part 405.

Based on an identifier of an article included in the header of the article, the elapsed time compensation part 405 requests the article server 2 for repute data through the article receiving part 70, obtains the number of readers and votes from the article server 2. The elapsed time compensation part 405 shortens the elapsed time calculated by an elapsed-time calculation part 402 for a specified period or by a specified reduction rate if either the number of readers or votes exceeds a specified number.

An image processing operation part 406 obtains a transparency rate, miniaturizing rate, or a transparency rate and a miniaturizing rate, corresponding to the elapsed time compensated by the elapsed-time compensation part 405, and generates a miniature image miniaturized at a rate calculated by multiplying the miniaturizing rate of original image obtained from the table of the processing data storage 30 by the miniaturizing rate corresponding to the elapsed time. The image processing operation part 406 further transforms the generated miniature image into a miniature image of a transparency rate corresponding to the elapsed time, and outputs this miniature image to a display unit 50 together with the coordinate data of the display position thereof.

Figure 10:
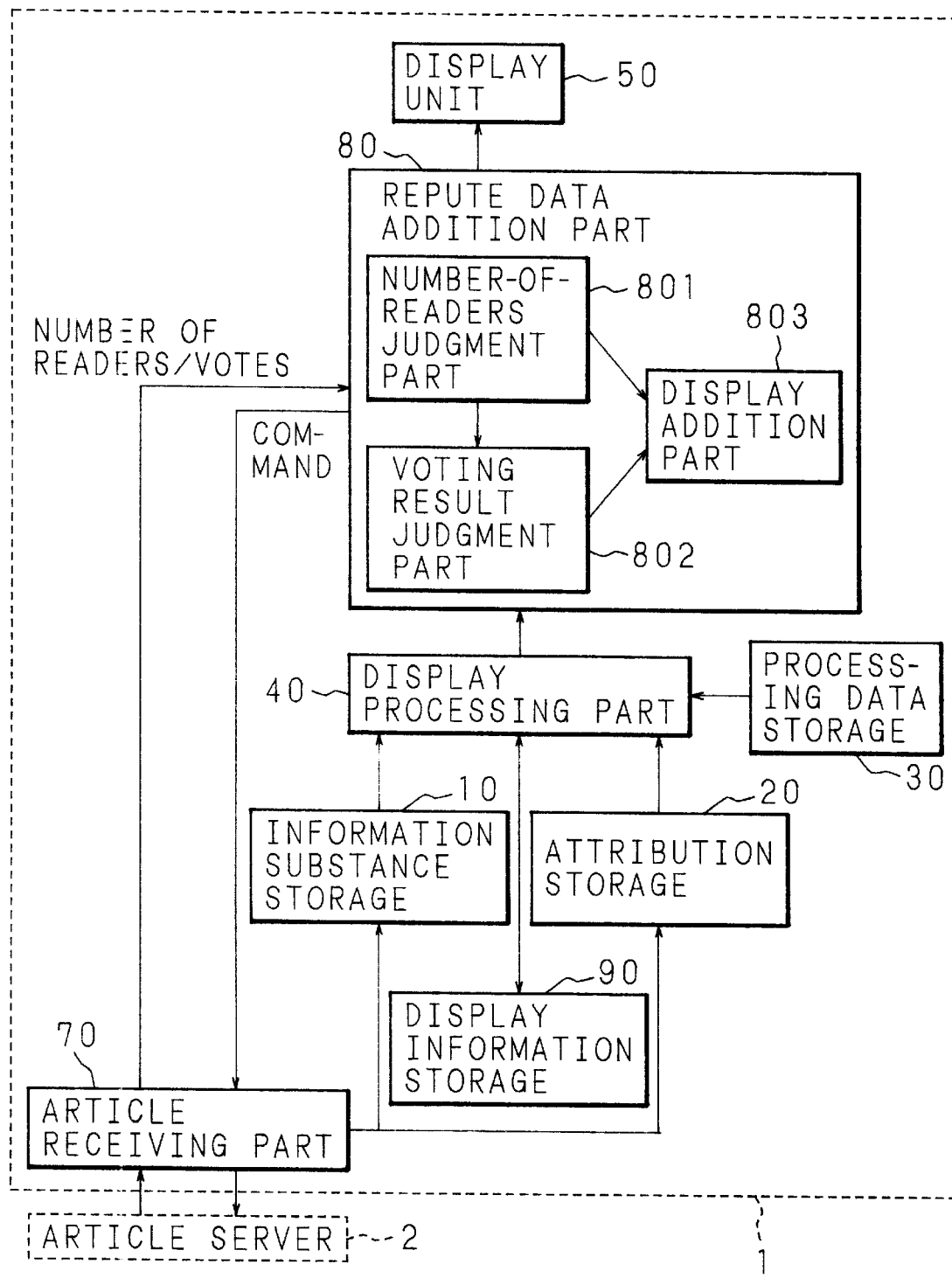
FIG. 10 is a block diagram of a modified example of embodiment 4 of the present invention.

FIG. 10 is a block diagram showing a modified example of embodiment 4. It should be noted that portions that are identical with or equivalent to those of embodiment 4 are marked with the same reference numerals and explanations thereof will be deleted.

In this modified example, the elapsed-time calculation part 402, the elapsed-time compensation part 405, and the image processing operation part 406 of embodiment 4 are replaced by a repute data addition part 80 for making displays for identification data of an article of high repute attract attention by, for instance, changing the display color for identification data of an article of high repute, which is the number of readers or votes exceeding a specified number or applying a mark to the identification data indicating high repute.

Based on an identifier of an article included in the header of the article, the repute data addition part 80 requests an article server 2 for repute data through an article receiving part 70, obtains the number of readers and votes from the article server 2. A display addition part 803 changes the display color for identification data, which may be a miniature image processed and generated by a display processing part 40, into a color different from colors for other identification data, and attaches a mark indicating high repute to the identification data, when it is either determined by a number-of-readers judgement part 801 that the number of readers exceeds a specified number or it is determined by a voting result judgement part 802 that the number of votes exceeds a specified number.

[Embodiment 5]

Figure 11:
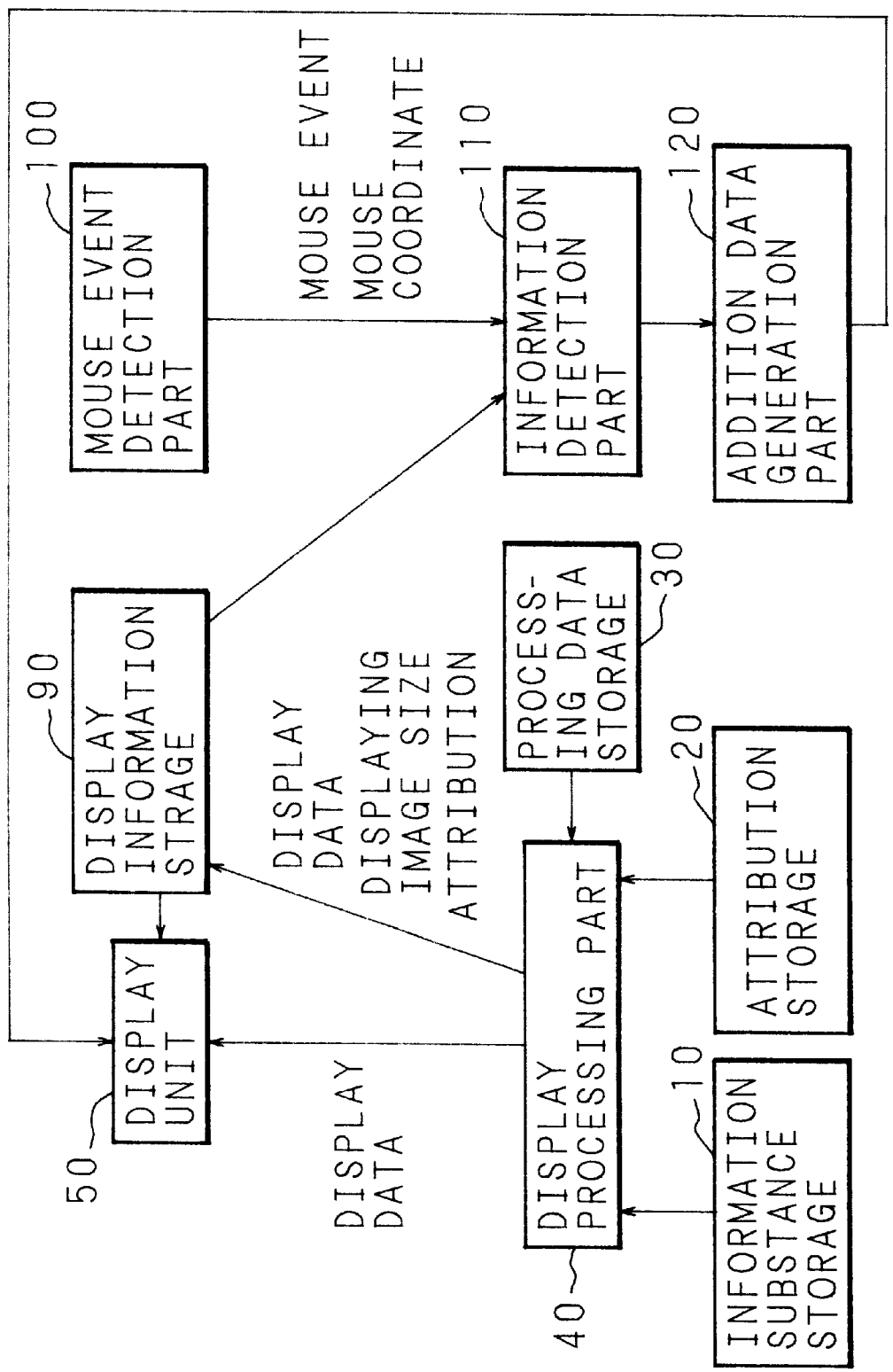
FIG. 11 is a block diagram of embodiment 5 of the present invention.

FIG. 11 is a block diagram showing embodiment 5 of a personal computer which is employed as the article retrieval support apparatus according to the present invention. It should be noted that portions that are identical with or equivalent to those of embodiment 1 are marked with the same reference numerals, and explanations thereof will be partially deleted. Further, it is supposed that a miniature image generated by a display processing unit 40 is stored in a memory (not shown), and a storage address thereof is entered in a table of a display information storage 90.

In this embodiment, addition data such as writer of the article or date of posting is displayed when a cursor figure which is moved by a mouse passes over identification data of articles displayed as in FIG. 3 (which are miniature images in FIG. 3).

For this purpose, the present embodiment comprises (1) a display information storage 90 for storing on a table (see FIG. 12) storage addresses of miniature image data processed and generated by the display processing part 40 (while there are none in case of icons of fixed bitmap) and image display sizes (while there are none in case of icons of fixed bitmap) along with storage addresses of attribution data in the display information storage 90 of articles including the display position coordinate, writer of the article, and date of posting; (2) a mouse event detection part 100 for detecting the type of a mouse event and a mouse coordinate; (3) an information detection part 110 for detecting to which article the miniature image, which is present on the display position of the cursor figure, belongs, based on the mouse coordinate when the mouse event detection part 100 has detected movements of the mouse as well as on the storage data of the display information storage 90 and for transferred data required for the image generation of addition data from the display information storage 90 to an addition data generation part 120; and (4) addition data generation part 120 for generating an image of addition data based on data sent from the information detection part 110 and displaying an image including the miniature image and this addition data on the display unit 50 and for erasing the miniature image with the addition data displayed on the display unit 50 when the miniature image does no longer exist on the display position of the cursor figure.

Figure 13:
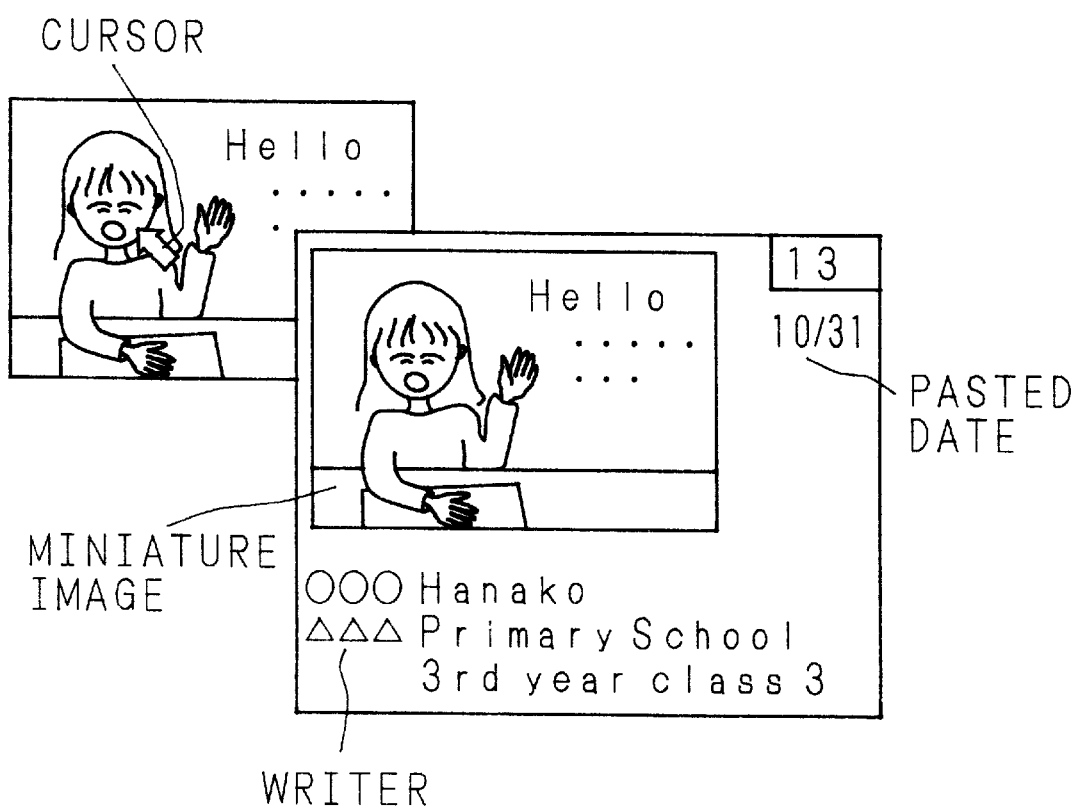
FIG. 13 is a diagram showing an example of a screen display of embodiment 5.

FIG. 13 is a diagram showing an example of a screen display of embodiment 5. As shown in the drawing, when the cursor passes over identification data of an article and the mouse event detection part 100 detects a movement of the mouse and a mouse coordinate, the information detection part 110 judges whether identification data are displayed on the position in which the cursor resides based on the mouse coordinate, display position and the image display size which are stored in the display information storage 90. When identification data are displayed, the information detection part 110 obtains attribution data of the article which the identification data, such as writer of the article or date on which the identification data was pasted (date of posting of the article) are obtained. The addition data generation part 120 displays an image which is the miniature image affixed with an image of this addition data, and erases this miniature image with addition data displayed on the display unit 50 when the identification data no longer exists on the position in which the cursor resides.

[Embodiment 6]

Figure 14:
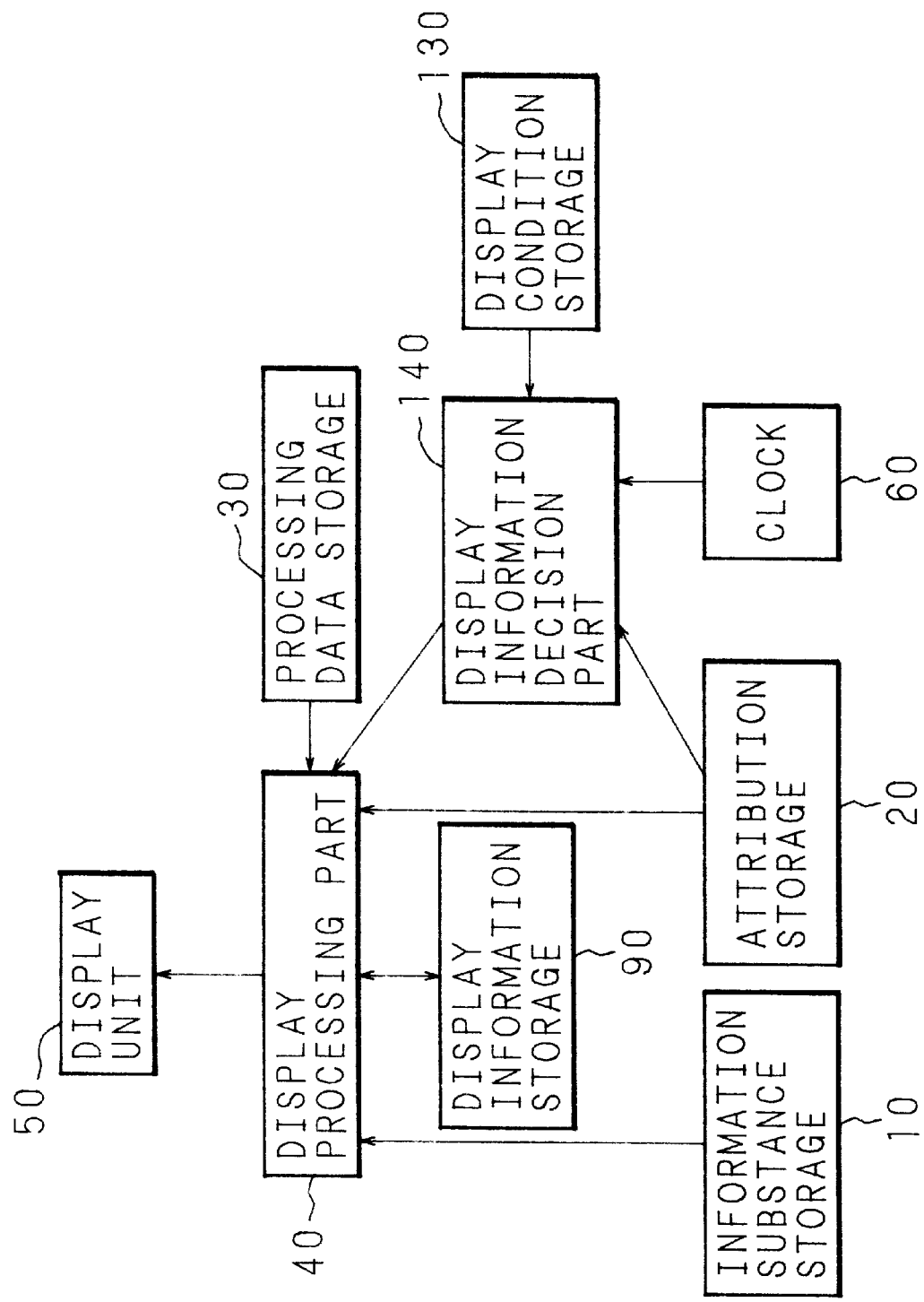
FIG. 14 is a block diagram of embodiment 6 of the present invention.

FIG. 14 is a block diagram showing embodiment 6 of a personal computer which is employed as the article retrieval support apparatus according to the present invention. It should be noted that portions that are identical with or equivalent to those of embodiment 1 are marked with the same reference numerals, and explanations thereof will be partially deleted. Further, it is supposed that a miniature image generated by a display processing unit 40 is stored in a memory (not shown), and a storage address thereof is entered in a table of a display information storage 90.

In this embodiment, when displaying identification data of articles as shown in FIG. 3 (which are miniature images in FIG. 3), the number of displaying images are limited.

For this purpose, the present embodiment comprises a display condition storage 130 for storing display conditions for determining identification data to be displayed such as validity for displaying the identification data of articles that is reckoned from the date of posting of the article, or the number of displaying images on one screen; a display information decision part 140 for determining identification data to be displayed by making reference to attribution data of the attribution storage 20 of FIG. 15 and judging whether the article satisfies the above display conditions so that it is an object to be displayed; and a clock 60 for providing the present time to the display information decision part 140. The above-mentioned display conditions are set by the user.

Further, in this embodiment, the date of posting of the article, that is, the date and time on which the identification data of the article was pasted is stored in the attribution table (see FIG. 15) of the attribution storage 20 as attribution data.

The display information decision part 140 makes reference to attribution data of articles for which generating identification data, and in case the display condition is "validity of display", calculates the elapsed time for the article based on the present date and time and the date and time on which the identification data of the article pasted. When the calculating result is within the validity, the display information decision part 140 instructs the display processing part 40 to generate identification data of the article, then causes the display unit 50 to display the identification data.

Further, in case the display condition is "number of displaying images", the display information decision part 140 refers to the attribution data of the attribution storage 20. When the number of displaying images counted from the newest date and time on which the identification data of the article was pasted is within the number set by the display condition, the display information decision part 140 instructs the display processing part 40 to generate identification data of the article, then causes the display unit 50 to display the identification data.

Though in the present embodiment, the user sets the number of displaying images on one screen, the display information decision part 140 may calculate the capable number of displaying images based on the area of the screen of the display unit 50 and the size of the image of the identification data.

[Embodiment 7]

Figure 16:
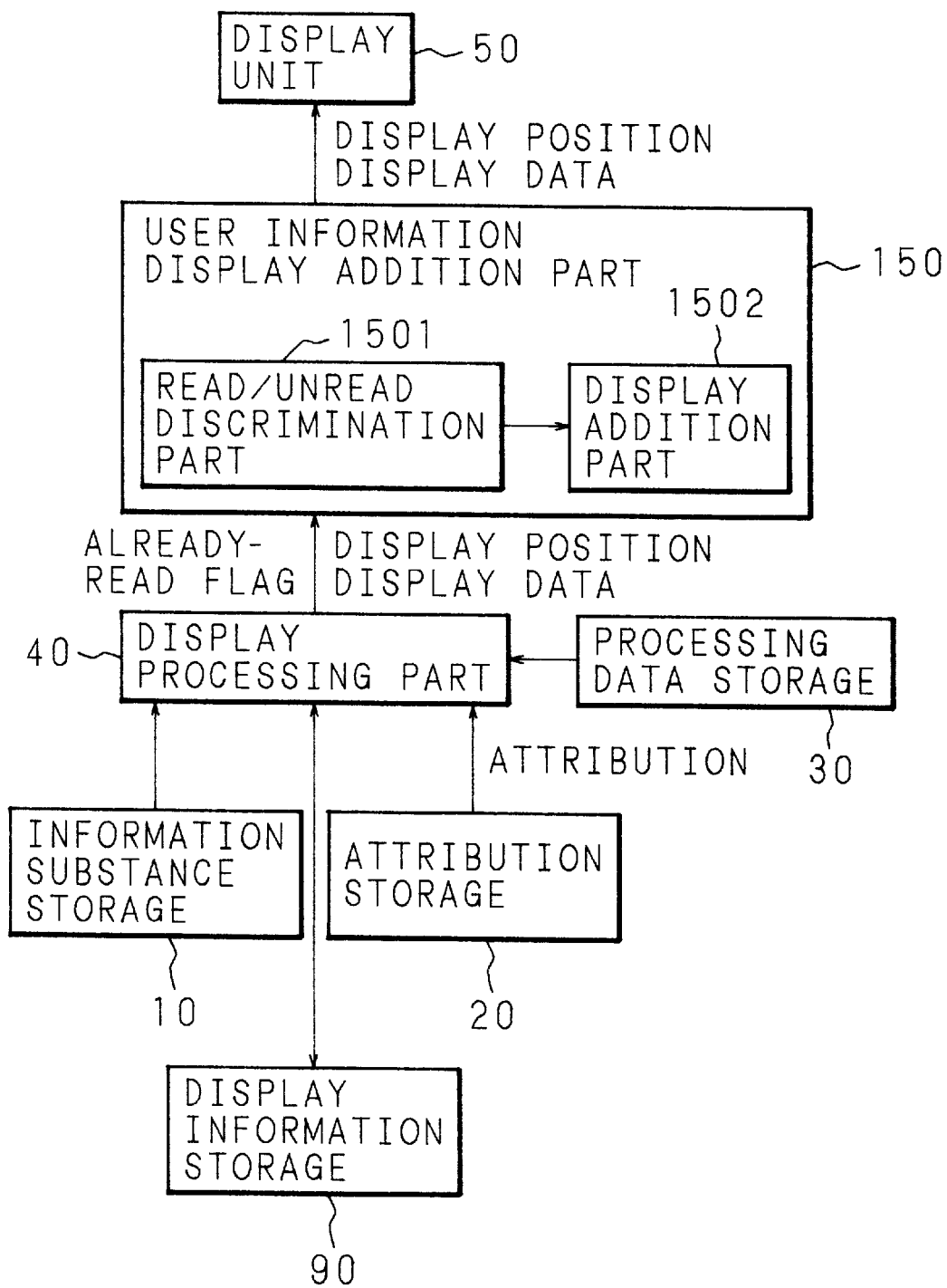
FIG. 16 is a block diagram of embodiment 7 of the present invention.

FIG. 16 is a block diagram showing embodiment 7 of a personal computer which is employed as the article retrieval support apparatus according to the present invention. It should be noted that portions that are identical with or equivalent to those of embodiment 1 are marked with the same reference numerals, and explanations thereof will be partially deleted. Further, it is supposed that a miniature image generated by a display processing unit 40 is stored in a memory (not shown), and a storage address thereof is entered in a table of a display information storage 90.

In this embodiment, when displaying identification data of articles as in FIG. 3 (which are miniature images in FIG. 3), the display is made to attract attention by, for instance, adding a thick frame or a motion picture to identification data of an unread article or changing the display color for the identification data to a different color from colors for other identification data.

For this purpose, the present embodiment is arranged that in the attribution table of the attribution storage 20 in FIG. 17 where a read flag is stored as a user information for indicating that the article has been read.

Further, the present embodiment is arranged to comprise a user information display addition part 150 including a read/unread discrimination part 1501 for discriminating whether the article has been read/unread by making reference to the table of the attribution storage 20, and a display addition part 1502 for adding a thick frame or a motion picture to identification data of unread article or changing the display color for the identification data to a different color from colors for other identification data when the unread article exists.

[Embodiment 8]

Figure 18:
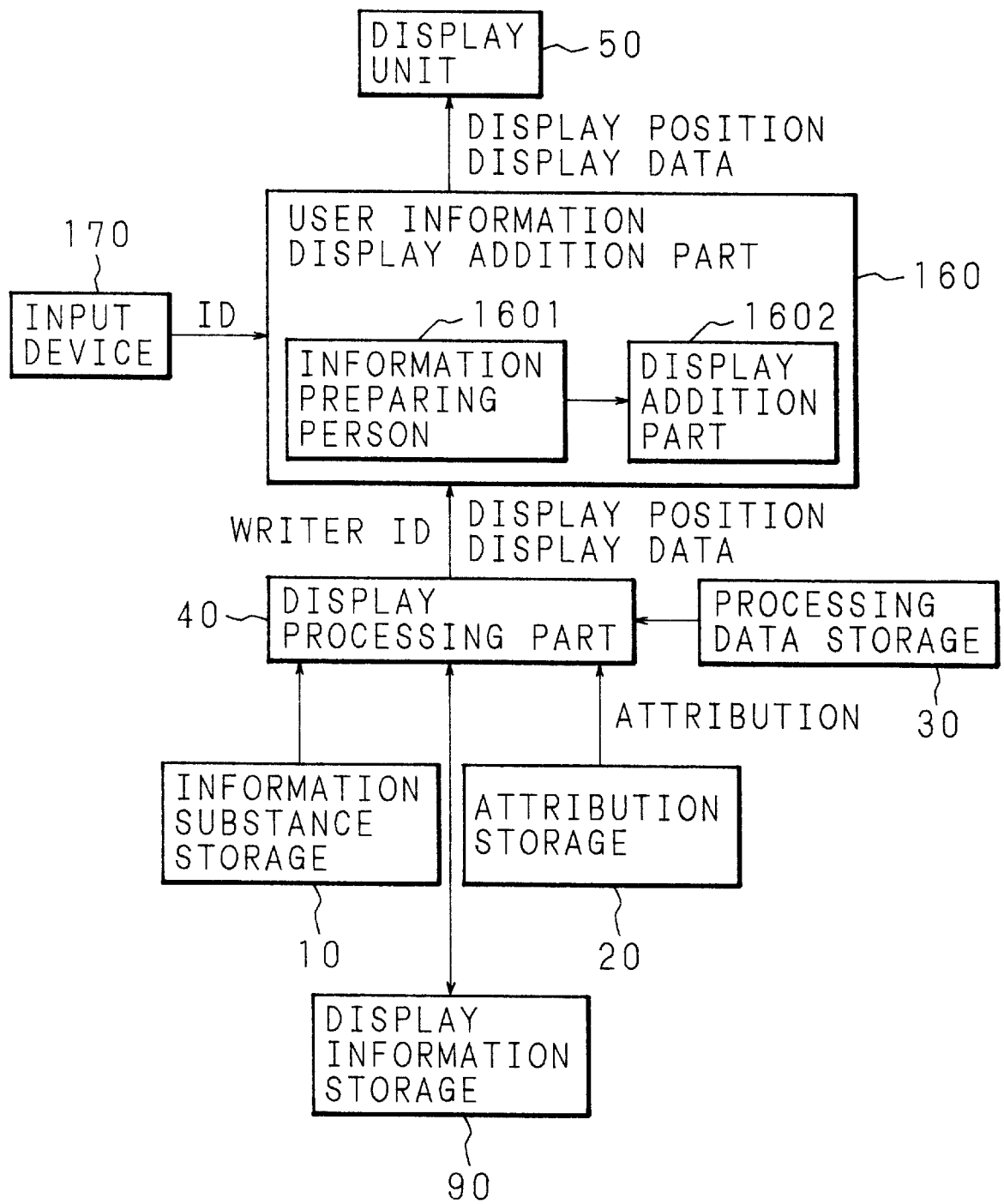
FIG. 18 is a block diagram of embodiment 8 of the present invention.

FIG. 18 is a block diagram showing embodiment 8 of a personal computer which is employed as the article retrieval support apparatus according to the present invention. It should be noted that portions that are identical with or equivalent to those of embodiment 1 are marked with the same reference numerals, and explanations thereof will be partially deleted. Further, it is supposed that a miniature image generated by a display processing unit 40 is stored in a memory (not shown), and a storage address thereof is entered in a table of a display information storage 90.

In this embodiment, when displaying identification data of an article as in FIG. 3 (which are miniature images in FIG. 3), the color of display for identification data of an article which has been pasted by the user is changed to a different color from colors for other identification data for purpose of discrimination.

For this purpose, in the attribution table of the attribution storage 20 in FIG. 19 is stored an identifier of the writer such as belonging organization of the writer of the article or name as user information. The identifier of the writer may be a personal ID of an electronic mail address or personal computer network.

Further, the present embodiment is arranged to comprise an input device 170 such as a keyboard for inputting the user identifier such as a user name, and a user information display addition part 160 including an information preparing person discrimination part 1601 for discriminating whether the writer of the article is the user of the personal computer by comparing the identifier of the user of the personal computer input by the input device 170 with the identifier of the writer stored in the table of the attribution storage 20 and a display addition part 1602 for changing the display color for the identification data to a different color from colors for other identification data in case the writer of the article is the user of the personal computer.

[Embodiment 9]

Figure 20:
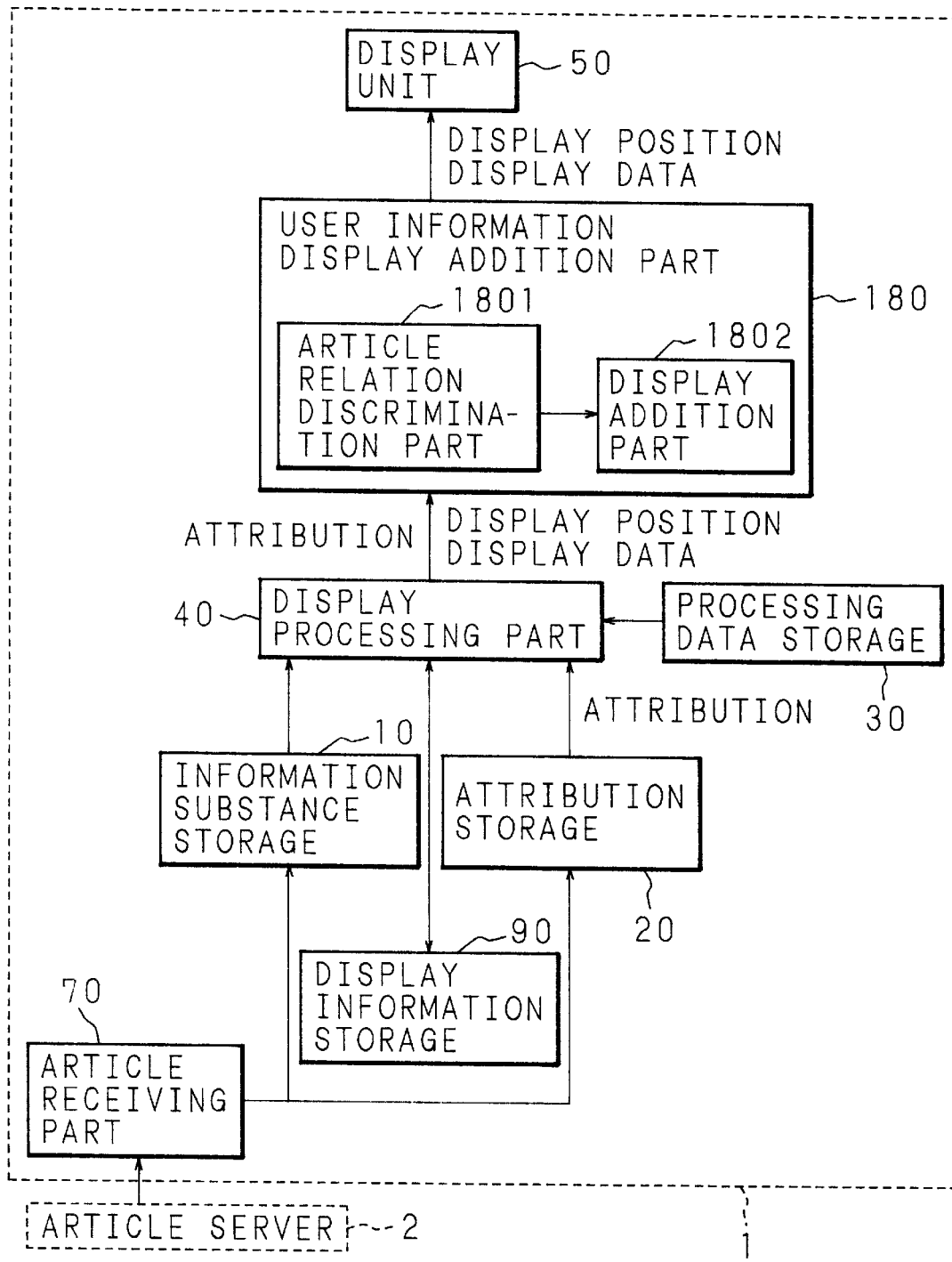
FIG. 20 is a block diagram of embodiment 9 of the present invention.

FIG. 20 is a block diagram showing embodiment 9 of a personal computer which is employed as the article retrieval support apparatus according to the present invention. It should be noted that portions that are identical with or equivalent to those of embodiment 1 and embodiment 4 are marked with the same reference numerals, and explanations thereof will be partially deleted. Further, it is supposed that a miniature image generated by a display processing unit 40 is stored in a memory (not shown), and a storage address thereof is entered in a table of a display information storage 90.

An article server 2 transfers articles which have been posted from plural personal computers which are clients to personal computers which have accessed thereto. In this embodiment, a personal computer 1 is connected as a client of the article server 2.

Further, the personal computer 1 according to this embodiment has a function to indicate relations between articles by, for instance, displaying an image of a yarn which ties identification data of articles in case the article is an article in reply to an article which has been posted by the user of the personal computer 1.

For this purpose, the present embodiment is arranged that the attribution storage 20 of FIG. 21 stores in the attribution table thereof data indicating relations between articles such as date and time on which the identification data of the article has been pasted (date and time of posting), on article ID as an identifier of the article, follow-up identifier (identifier of the original article in case it is an article in reply) or title of the article. An article receiving part 70 stores information substance received from the article server 2 in an information substance storage 10 and stores attribution data and the above-mentioned data included in the article header in the attribution storage 20.

Further, the present embodiment is arranged to comprise a user information display addition part 180 including an article relation discrimination part 1801 for discriminating relations between articles by referring to data for indicating relations between articles stored in the table of the attribution storage 20 and a display addition part 1802 for adding an image indicating the relation between identification data of the related articles.

In the user information display addition part 180, in case it is discriminated by the article relation discrimination part 1801 that the article is an article in reply and the follow-up identifier of the table of the attribution storage 20 indicates the presence of original article, the display addition part 1802 adds an image such as a yarn which ties the identification data of these articles processed and generated by the display processing part 40.

Figure 22:
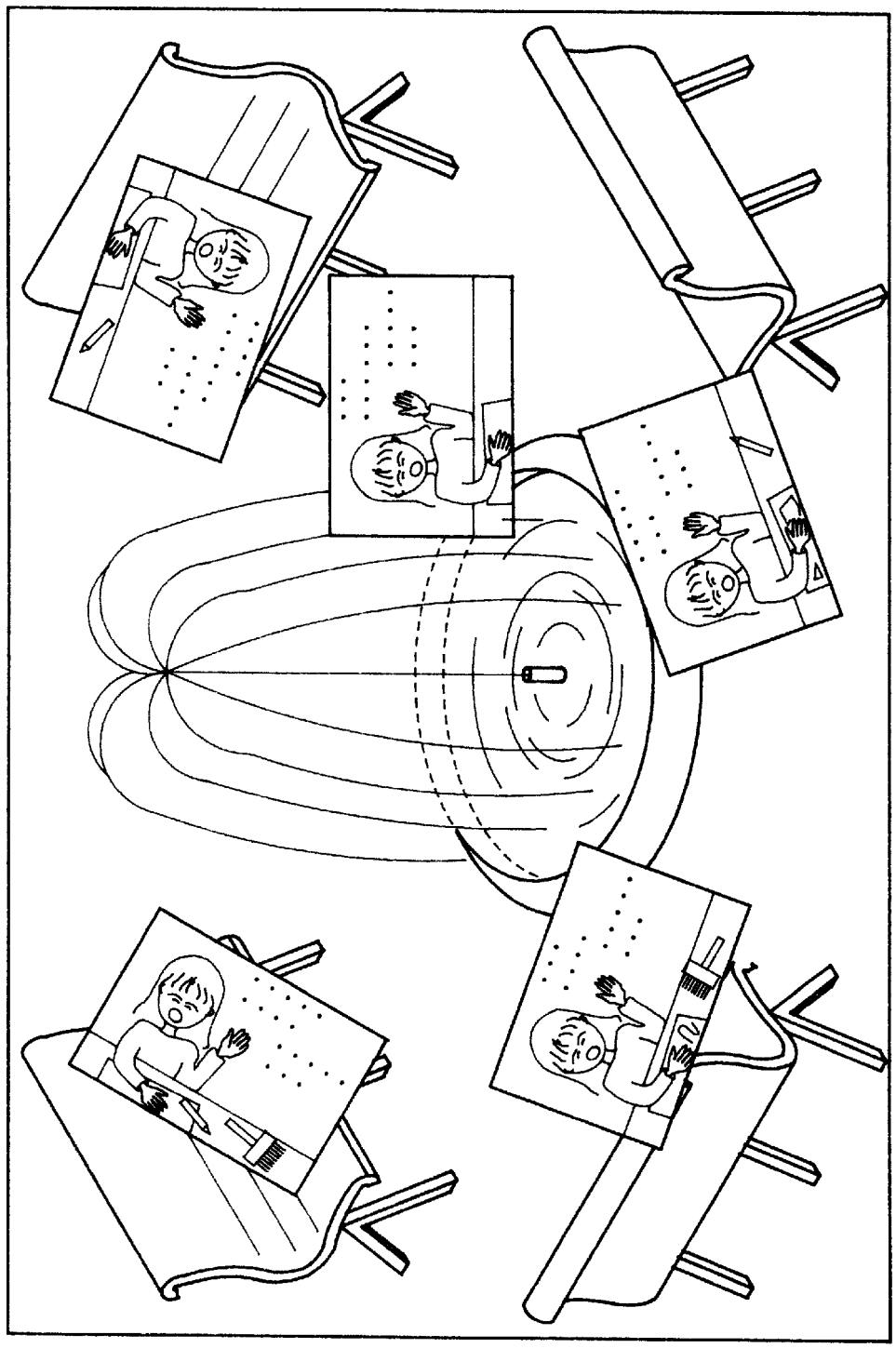
FIG. 22 is another example of a screen display according to the present invention.

FIG. 22 is a diagram showing another example of a screen display of the article retrieval support apparatus according to the present invention.

While in the example of screen display in FIG. 3 identification data are displayed in the same direction and without inclination, it is also possible to display the identification data as being inclined. Changing the angle of the identification data may be performed by, for instance, the user turns the data once displayed without inclination by grasping the edge thereof through a click operation, whereby the mouse event is detected to change the display angle of the identification data.

It should be noted that such changes in display styles of identification data may also be performed by combining a plurality of types such as changing both, the transparency rate and miniaturizing rate in accordance with the elapsed time.

Further, the identification data, attribution data, or addition data are not limited to still pictures but may also be motion pictures.

Figure 23:
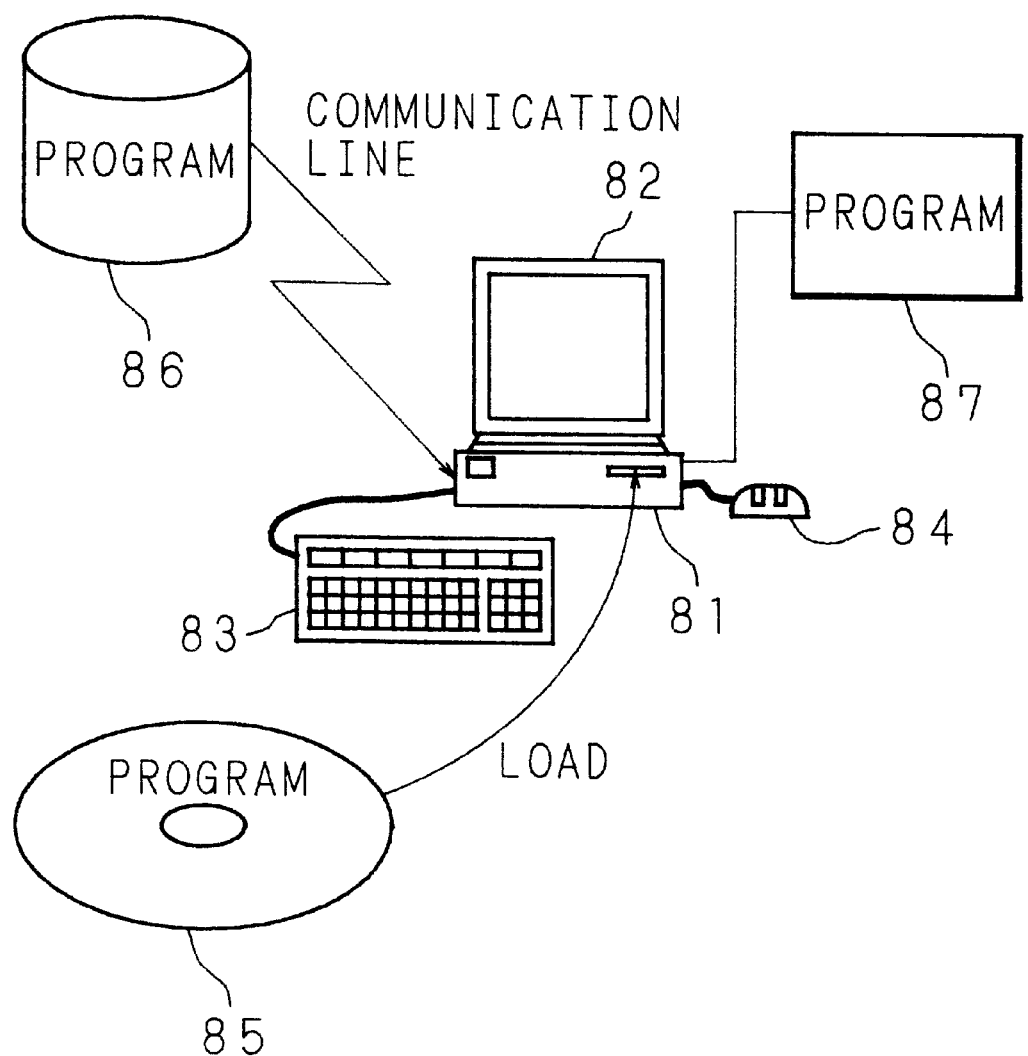
FIG. 23 is a schematic diagram showing a hardware arrangement for realizing the present invention.

FIG. 23 is a schematic diagram showing a hardware arrangement for realizing the present invention. The present hardware comprises a personal computer 81 as a processing device, a display 82 for displaying character data or the like, a keyboard 83 and a mouse 84 as input devices. The personal computer 81 loads a program for performing the above-described processes either from a portable recording medium 85 such as a magnetic disk or CD-ROM, a memory 86 at the line destination which may be, for instance, provided at a center which enables either wireless or wired communication of programs with the personal computer 81, or a memory on the side of the processing device 87 such as a RAM or hard disk provided in the personal computer 81.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for supporting retrieval of articles which comprises an article substance storage for storing the substance of an article, an article attribution storage for storing attribution data of the article, and a processing data storage for storing data for processing the article substance, and the apparatus which supports retrieval of articles by generating a miniature image of an image of the article through processing the article substance and by displaying the miniature image on the screen, said apparatus comprising:

averaged image generation means for calculating an average value of pixel values in each image portion which is divided from an image of an article depending on a miniaturizing rate of the image and for generating a miniature image which is composed of a gathering of pixels of the averaged values, a sharpening operation part detecting an edge of the miniature image and emphasizing the edge, gray level transform operation means for transforming a gray level value of each pixel of the miniature image into a gray level value which emphasizes a contrast of the miniature image, OR operation means for generating a miniature image by performing OR operation of pixel values of neighboring pixels of the miniature image; and miniaturizing method decision means for determining, according to the type of the image of the article, whether to make the averaged image generation means or the OR operation means operate for generating a miniature image, and in case the averaged image generation means is made to operate to generate a miniature image, whether to make the sharpening operation means operate or to make the sharpening operation means and the gray level transform operation means operate for processing the miniature image.

2. An apparatus for supporting retrieval of articles according to claim 1, further comprising:

a display condition storage storing display conditions for the miniature image which is supposed to be an object to be displayed on the screen, display information decision means for determining a miniature image that satisfies the display conditions as the object to be displayed: and display means for displaying the miniature image decided to be the object to be displayed by the display information decision means.

3. An apparatus for supporting retrieval of articles which comprises an article substance storage for storing the substance of an article, an article attribution storage for storing attribution data of the article, and a processing data storage for storing data for processing the article substance, and the apparatus which supports retrieval of articles is supported by displaying on a screen an image of identification data of the article which has been generated by processing the article substance, said apparatus comprising:

time counting means, a storage storing data of a time at which the article is posted, elapsed-time calculation means for calculating an elapsed time from the time at which the article is posted up to the time at which the image of the identification data of the article is displayed on the screen, show-through image generation means for generating a show-through image by calculating a pixel value from each pixel value of the image of the identification data at which a transparency rate of an image of identification data relative to a background is a transparency rate which is proportional to the length of the elapsed time; and display means for displaying the show-through image generated by the show-through image generation means on the screen.

4. An apparatus for supporting retrieval of articles which comprises an article substance storage for storing the substance of an article, an article attribution storage for storing attribution data of the article, and a processing data storage for storing data for processing the article substance, and the apparatus which supports retrieval of articles by displaying on a screen an image of identification data of the article which has been generated by processing the article substance, said apparatus comprising:

time counting means, a storage storing data of the time at which the article is posted, elapsed-time calculation means for calculating the elapsed time from the time at which the article is posted up to the time at which the image of the identification data of the article is displayed on the screen, miniature image generation means for generating, from the image of the identification data, a miniature image which is miniaturized at a miniaturizing rate which is proportional to the length of the elapsed time; and display means for displaying the miniature image generated by the miniature image generation means.

5. An apparatus for supporting retrieval of articles which comprises an article substance storage for storing the substance of an article which is posted to an article server arranged to obtain repute data indicating a height of a repute of an article which has been referred to and to provide the repute data when articles are retrieved, an article attribution storage for storing attribution data of the article, and a processing data storage for storing data for processing the article substance, and the apparatus which supports retrieval of articles by displaying on a screen an image of identification data of the article which is generated by processing the article substance, said apparatus comprising:

time counting means, a storage storing data of the time at which the article is posted, elapsed-time calculation means for calculating an elapsed time from the time at which the article is posted up to the time at which the image of the identification data of the article is displayed on the screen, image processing operation means for eliminating the image of identification data of the article for which the elapsed time has reached a specified time from among objects to be displayed, elapsed-time compensation means for shortening the elapsed time depending on the height of the repute of the article indicated by the repute data provided by the article server; and display means for displaying on the screen the images of identification data which are objects to be displayed as determined by the image processing operation means.

6. An apparatus for supporting retrieval of articles which comprises an article substance storage for storing the substance of an article which is posted to an article server arranged to obtain repute data indicating a height of a repute of an article which has been referred to and to provide the repute data when articles are retrieved, an article attribution storage for storing attribution data of the article, and a processing data storage for storing data for processing the article substance, and the apparatus which supports retrieval of articles by displaying an image of identification data of the article which is generated by processing the article substance on a screen, said apparatus comprising:

repute data judgement means for detecting whether a height of the repute of an article indicated by the repute data as provided by the article server exceeds a specified level;

means for changing the display style of the image of identification data of the article with the repute that exceeds the specified level to be different from the styles of the images of identification data of the other articles with the repute that does not exceed the specified level; and display means for displaying the image of the identification data in the style changed by the means along with the images of identification data of the other articles.

7. An apparatus for supporting retrieval of articles according to claim 6, further comprising:
   a display condition storage storing display conditions for the image of identification data which is supposed to be an object to be displayed on the screen; and
   display information decision means for determining an image of identification data that satisfies the display conditions as the object to be displayed, wherein
   the display means displays the image of the identification data decided to be the object to be displayed by the display information decision means.

8. An apparatus for supporting retrieval of articles which comprises an article substance storage for storing the substance of an article, an article attribution storage for storing attribution data of the article, and a processing data storage for storing data for processing the article substance, and the apparatus which supports retrieval of articles by displaying an image of identification data of the article which is generated by processing the article substance on a screen, said apparatus comprising
   a display information storage storing positional data of the images of identification data displayed on the screen,
   position detection means for detecting a display position designated by a figure which is be movable on the screen for designating a position on the screen,
   addition data generation means for generating an image of addition data indicating an attribution of the article,
   information detection means for detecting an image of identification data on a position designated by the figure; and
   display means for displaying the image of the addition data in the proximity of the image of the identification data detected by the information detection means.

9. A recording medium readable by an apparatus for supporting retrieval of articles which comprises an article substance storage for storing the substance of an article, an article attribution storage for storing attribution data of the article, and a processing data storage for storing data for processing the article substance, and the apparatus which supports retrieval of articles by a miniature image of an image of the article through processing the article substance and displaying the miniature image on the screen, said recording medium comprising:
   program code means for causing the apparatus to calculate an average value of pixel values in each image portion which is divided from an image of an article depending on a miniaturizing rate of the image, and to generate a miniature image which is composed of a gathering of pixels of the averaged values,
   program code means for causing the apparatus to detect an edge of the miniature image and to emphasize the edge,
   program code means for causing the apparatus to transform a gray level value of each pixel of the miniature image into a gray level value which emphasizes a contrast of the miniature image,
   program code means for causing the apparatus to generate a miniature image by performing OR operation of pixel values of neighboring pixels of the miniature image; and
   program code means for causing the apparatus to determine, according to the type of the image of the article, whether to generate a miniature image by the gathering of averaged pixels or by performing the OR operation, and in case generating a miniature image by the gathering of averaged pixels, whether to generate a miniature image by emphasizing the edge or by emphasizing the edge and transforming the gray level into a value at which the contrast is emphasized.

10. A recording medium readable by an apparatus for supporting retrieval of articles which comprises an article substance storage for storing the substance of an article, an article attribution storage for storing attribution data of the article, and a processing data storage for storing data for processing the article substance, and the apparatus which supports retrieval of articles by displaying an image of identification data of the article which is generated by processing the article substance on a screen, said recording medium comprising:
   program code means for causing the apparatus to count time,
   program code means for causing the apparatus to store data of a time at which the article is posted,
   program code means for causing the apparatus to calculate an elapsed time from the time at which the article is posted up to the time at which the image of the identification data of the article is displayed on the screen,
   program code means for causing the apparatus to generate a show-through image by calculating a pixel value from each pixel value of the image of the identification data at which a transparency rate of an image of identification data relative to a background is a transparency rate which is proportionate to the length of the elapsed time; and
   program code means for causing the apparatus to display the generated show-through image on the screen.

11. A recording medium readable by an apparatus for supporting retrieval of articles which comprises an article substance storage for storing the substance of an article, an article attribution storage for storing attribution data of the article, and a processing data storage for storing data for processing the article substance, and the apparatus which supports retrieval of articles by displaying an image of identification data of the article which is generated by processing the article substance on a screen, said recording medium comprises:
   program code means for causing the apparatus to count time,
   program code means for causing the apparatus to store data of the time at which the article is posted,
   program code means for causing the apparatus to calculate the elapsed time from the time at which the article is posted up to the time at which the image of the identification data of the article is displayed on the screen,
   program code means for causing the apparatus to generate, from the image of the identification data, a miniature image which is miniaturized at a miniaturizing rate proportional to the length of the elapsed time; and
   program code means for causing the apparatus to display the generated miniature image on the screen.

12. An article retrieval system for a computer having an article storage storing an article and an article attribution storage storing attribution data of an article image corresponding to the article, said article retrieval system comprising:
   a decision unit determining a suitable method of miniaturizing the article image based upon the attribution data of the article image; and
   a display processor generating a miniature image of the article image based upon the method determined by the decision unit.

* * * * *